C. L. POOR.
NAVIGATION INSTRUMENT.
APPLICATION FILED JAN. 10, 1918.
1,308,748.
Patented July 1, 1919.
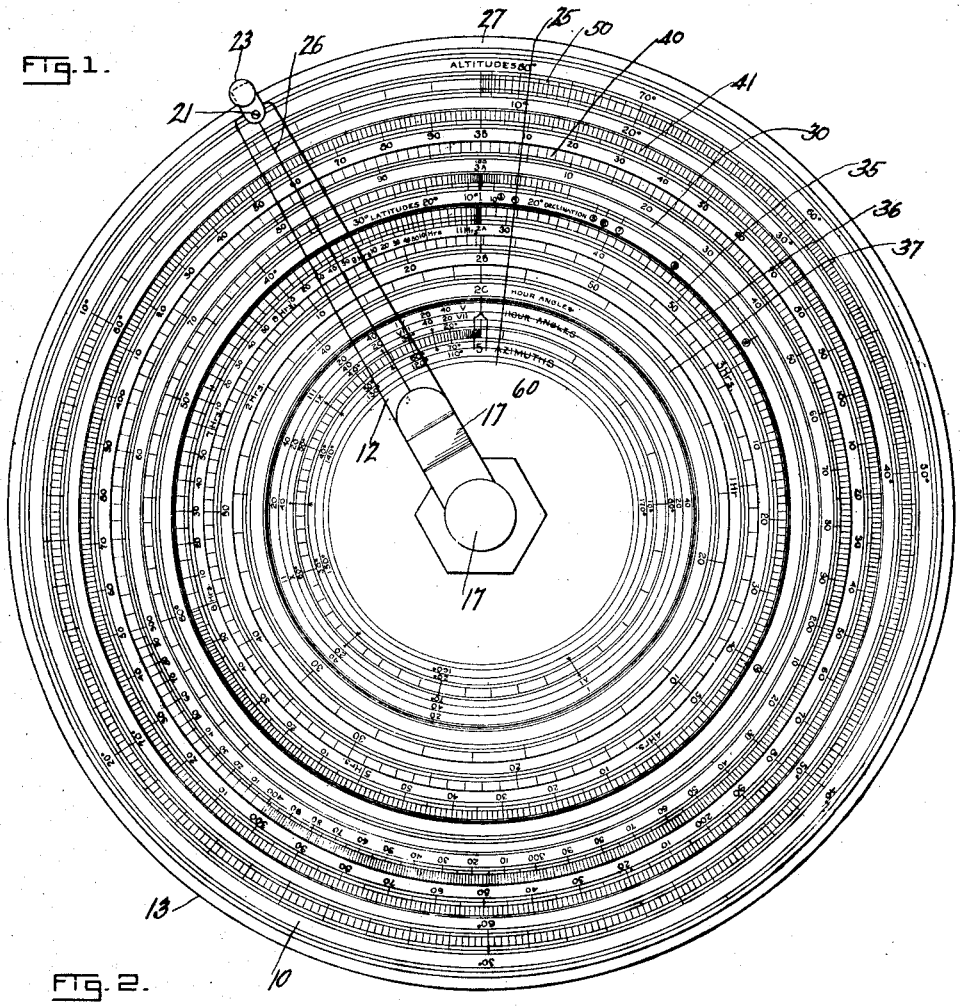
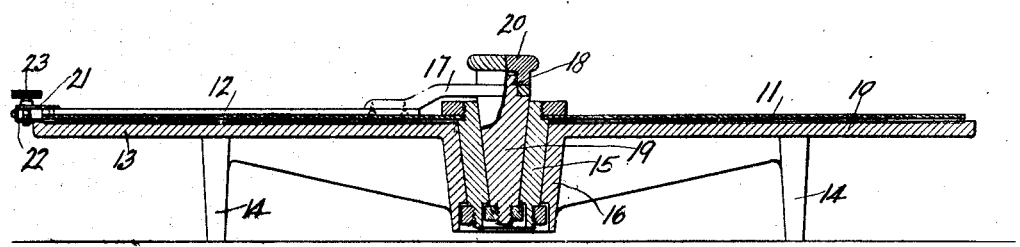
WITNESSES
INVENTOR
Charles Lane Poor
BY
ATTORNEYS

UNITED STATES PATENT OFFICE.

CHARLES LANE POOR, OF DERING HARBOR, SHELTER ISLAND, NEW YORK.

NAVIGATION INSTRUMENT.

1,308,748.     Specification of Letters Patent.     Patented July 1, 1919.

Application filed January 10, 1918. Serial No. 211,222.

*To all whom it may concern:*

Be it known that I, CHARLES LANE POOR, a citizen of the United States, and a resident of the village of Dering Harbor, Shelter Island, in the county of Suffolk and State of New York, have invented a new and Improved Navigation Instrument, of which the following is a full, clear, and exact description.

The invention relates to aerial and marine navigation, and its object is to provide a new and improved navigation instrument more especially designed for use on aeroplanes, to enable the aviator to quickly determine the position of the aeroplane while in flight and without resorting to the use of logarithmic tables or requiring any logarithmic and other calculations.

In order to produce the desired result use is made of three elements, namely, a chart having a series of concentric scales and two indicating members on the said scales, one of the said elements being fixed and the other two elements having movement relative to the fixed element and having movement independent of the other, one of the said scales representing latitudes and declinations, another representing hour angles, another representing logarithms and numbers, another representing altitude and zenith distances, and another representing azimuths, the starting points of the said scales being disposed in a radial line. Use is also made of a fastening means for fastening the said two movable elements together to permit of temporarily moving the same in unison with each other.

A practical embodiment of the invention is represented in the accompanying drawings forming a part of this specification, in which similar characters of reference indicate corresponding parts in both views.

Figure 1 is a plan view of the navigation instrument;

Fig. 2 is a sectional side elevation of the same, and Fig. 3 is a diagram illustrative of the position of a ship at sea.

The invention is based on the "new navigation" according to the method developed by Admiral Marcq Saint-Hilaire, and which may be used with observations made at any time with equally good and consistent results, and which is applicable to all conditions and is available regardless of azimuth, altitude or hour angle.

As is well known the altitude of the sun or a star, measured by a sextant, determines a definite circle of position on which the observer is located. This circle of position is a small circle on the surface of the earth, and the observed altitude, taken by itself, merely indicates that the observer is somewhere on this circle—neither inside nor outside of it but on it.

This circle might be plotted on a chart. When this circle is plotted on a chart it will be found in general that the position of the ship, as determined by dead reckoning, will not fall upon the circumference of the circle. Only when the position by dead reckoning (the position as calculated by means of the compass course sailed, and the estimated distance run) agrees exactly with the true position of the ship will the circle of position pass through the ship's plotted place on the chart. The ship will usually appear to be within or without the circle, or at D of the diagram shown in Fig. 3 and in which S represents the point on the earth's surface directly under the sun, or the subsolar points, and C C' the circle of position, or the circle on which the sextant observation shows the ship to be, and D the position by dead reckoning, or that on which the navigator thought himself to be.

Now the problem of navigation is to find the most probable position of the ship on the circle of position. The point D, on which the ship is supposed to be, is known, and the radius of the circle of position, C C' is found directly by measurement with the sextant. The simplest assumption is that the ship is on the straight line joining D, the position by dead reckoning to the subsolar point S—that the ship is in reality at the point A of the diagram. This assumption is the basis of the St. Hilaire method.

To find the point A, from D, two factors must be determined, the distance DA and the bearing or direction of A as seen from D. These two factors can only be found by mathematical calculation, and the method of calculating the distance DA forms the essential element in the St. Hilaire method. The distance SA is known from the sextant observation, and the distance SD can be calculated, and hence the distance DA, the difference between these two found by simple subtraction. The distance SD can only be found by elaborate mathematical calculation from the certain known data, namely, the assumed position of the ship at D and the position of the sun (or star) in the heavens. This latter is given by the *Nautical Almanac* for the time of observation. The mathematical formula by which this distance SD is calculated is:

$$SD = Z$$

and $$\text{hav. } Z = \cos. D \cos. L \text{ hav. } t + \text{hav. } (L \sim D)$$

where

Z = zenith distance of the sun, star or other heavenly body.

D = declination of the sun, star or other heavenly body.

L = latitude by dead reckoning of the ship or aerial vessel.

t = hour angle of sun, star or other heavenly body at moment of observation and as determined from the known position of the heavenly body and the longitude of the ship or aerial vessel, and the abbreviations hav. and cos. have the usual trigonometrical significance of haversines and cosines, respectively.

Heretofore this formula has been solved by logarithmic calculation and such calculation takes considerable time, requires a number of specially prepared logarithmic tables, and necessitates considerable knowledge and experience on the part of the navigator.

The second factor, the bearing of the sun, or the direction A, as seen from D, can either be found by similar long mathematical calculation, or taken from especially prepared azimuth tables. The mathematical formula by which this azimuth is calculated is:

$$\text{Sin. } A = \sin. t \cos. D \sec. h$$

where

A = azimuth of the sun, star or other heavenly body.

h = altitude of the sun, star or other heavenly body at the moment of observation, and the abbreviations sin., cos. and sec. have their usual trigonometrical significance.

The navigating instrument or computing machine presently described in detail solves mechanically all the mathematical work required in the St. Hilaire method. It actually performs all the logarithmic calculations, and by a few simple movements does the actual calculation, which the navigator has heretofore made with paper and pencil. It solves the equation for Z, and also finds the second factor, the azimuth. By the use of the instrument all logarithmic tables, azimuth tables and all mathematical calculations are dispensed with and renders the use of the instrument especially serviceable on aeroplanes where special logarithmic tables are useless.

The navigation instrument consists essentially of three elements, namely, a chart 10 and two indicating members 11 and 12. As illustrated in the drawings the chart 10 is fixed on the top of a suitable base 13 provided with legs 14 for supporting the instrument on a table or other support. The indicating element 11, as shown, is in the form of a disk of celluloid or other diaphanous material overlying the chart 10, and the said disk 11 is provided with a hub 15 mounted to turn in a bearing 16 forming part of the base 13. The indicating element 12 is in the form of an arm of celluloid or other suitable diaphanous material and it overlies the disk 11. The arm 12 is attached to a metallic arm 17 mounted to turn on the reduced end 18 of a pivot 19 mounted to turn in the hub 15. A knurled head 20 screws on the upper threaded reduced end 18 of the pivot 19 to hold the arm 17 in place and to clamp the same in position on the pivot. A clamping device is carried on the arm 12 and serves to clamp the disk 11 and the arm 12 together so as to rotate in unison. Normally, however, the fastening device is in non-clamping position to allow independent movement of the arm 12 relative to the disk 11. The clamping device consists of an arm 21 secured to the outer end of the arm 12 and on this is pivoted or hinged a clamping arm 22 engaging the under side of the disk 11 to clamp the latter against the under side of the arm 12. A clamping screw 23 extends through the arm 21 and screws into the clamping arm 22 to move the latter into clamping or unclamping position as the operator turns the screw 23 correspondingly up or down.

The disk 11 is provided with a radially disposed indicating line 25 and a similar radial line 26 is arranged on the arm 12. The said lines 25 and 26 intersect five main concentric scales of the chart 10, which scales are visible through the diaphanous arm 12 and the disk 11. The starting points of the several scales on the chart 10 are arranged in a radial line 27 formed on the chart 10. One of the scales is for latitude and declinations, another is for hour angles, a third is for logarithms and numbers, a fourth for altitude and zenith distances, and a fifth for azimuths. The latitude and declination scale 30 has the latitudes marked in degrees and fractions on the left hand side of the starting line 27 and the declinations are marked to degrees and fractions and shown at the right hand side of the starting line 27. As the declination of the sun never exceeds 23½° the graduation ends at 25°, but in order to make the instrument applicable to stellar observations the declinations of the principal navigational stars are indicated by corresponding numerals 3, 4, 5, 6, 7, 8, 9 and 10, each surrounded by a circle, as plainly indicated in Fig. 1. The hour angles are represented by three scales 35, 36 and 37 and are given to single minutes between 15$^m$ and 12 hours. The hour angle scale 35 shows all hour angles to single minutes between 2$^h$ 27$^m$ and 12 hours, the hour angle scale 36 discloses all hour angles to single minutes between 0$^h$ 46$^m$ and 2$^h$ 27$^m$, and the scale 37 shows all hour angles between 14$^m$ and 46$^m$. Logarithms and numbers are shown in two scales 40 and 41 which are used together, the divisions in the scale 40 being from 0 to 500 and spaced logarithmically, and the divisions of the scale 41 being equal and numbered from 0 to 500. Altitude and zenith distance is shown in scale 50 graduated into degrees and fractions and numbered on the inner side for zenith distances and on the outer for altitudes. The azimuths are represented by a scale 60 divided into a number of concentric scales and divided into degrees and fractions and lettered for hour angles and azimuths. The hour angles are shown in two series, one from 0$^h$ 24$^m$ to 12 hours proceeding from the starting line 27 toward the right, and the other from 6$^h$ to 11$^h$ 36$^m$ proceeding from the starting line 27 to the left. Hour angles less than 24$^m$ are not shown. The azimuths are shown in degrees in two series. Those from 6° to 90° appear to the right of the line 27 and those from 90° to 174° appear to the left of the starting line 27.

Three quantities are known, either from observation or by dead reckoning: First, the latitude of the ship at the moment the observation is made. This latitude is determined by dead reckoning and is that in which the ship is supposed to be. It is taken to the nearest even number of minutes on the scale 30 to the left of the starting line 27. Second, the declination of the observed body whether sun or star. This declination is obtained from the *Nautical Almanac* and is to be taken to the nearest number of minutes of scale 30 to the right of the starting line 27. Third, the hour angles of the observed body. This is found from the chronometer time at which the observation is made together with the ship's longitude by dead reckoning. For the sun this hour angle is the ship's apparent time and the hour angles are represented by the scales 35, 36 and 37. From these three quantities which are known or easily calculated, as above stated, the problem is to find the corresponding altitude $h$ and the azimuth $a$ of the observed body. The altitude thus calculated is that at which the body would have been observed had the position of the ship by dead reckoning coincided with the actual position of the vessel on the surface of the ocean. The calculation of the altitude by means of the navigation instrument is reduced to four simple and direct movements as follows: The disk 11 is turned until its radial line 25 coincides with the declination on the scale 30, and, next, the arm 12 is swung around until its radial line 26 indicates on the latitude of the scale 30. The arm 12 and the disk 11 are now fastened together by screwing down the nut 20. Second, the disk 11 and the arm 12 are now turned until the radial line 25 of the disk coincides with the hour angle as determined from the chronometer and then the number appearing below the radial line 26 of the arm 12 on the graduation scale 40 is noted by the operator. In case the hour angle is found on the scale 36 the number obtained is divided by 10. If the hour angle is found on the scale 37 then the number found is divided by 100. Third, the disk 11 is turned until its radial line 25 coincides with the starting line 27 and the arm 12 is now turned to the angle corresponding to the difference between the latitude and the declination at the zenith distance scale 50 to the right of the starting line 27, provided both the latitude and declination are of the same name, that is, both north or both south. If they are of opposite names, one north and one south then the sum of the two is used and the radial line 26 of the arm 12 is set on the angle corresponding to this sum. Fourth, the arm 12 and the disk 11 are again fastened together. The disk 11 and the arm 12 are now turned until the radial line 25 of the disk is over the same number on the scale 41, as stated under operation 2. The required altitude will be found under the line 26 of the arm 12 on the altitude scale 50. The azimuth of the body may be found by two simple steps: First, the disk 11 is turned until its radial line 25 is on the hour angle of the body on the azimuth scale 60, division V. The arm 12 is turned until its radial line 26 coincides with the altitude of the body on the azimuth scale 60, division V. The arm and the disk are now fastened together. Second, the arm and the disk are now turned until the radial line 26 of the arm 12 is over the declination scale 30 of the body on the azimuth scale 60, division V. Under the line 25 of the disk 11 the operator reads the required azimuth. The required azimuth may be greater or less than 90° and, in general, the conditions under which the observation was made will determine this at once. In some cases when the observed body is nearly east or west some confusion might occur when the following rules will act as guides: First, when declination and latitude are of contrary names (one south, one north) then the azimuth will always be greater than 90°. Second, if the declination is greater than the latitude and both of the same name, then the azimuth will always be less than 90°.

In order to illustrate the use of the navigation instrument, it is presumed that a ship is at sea November 9, in dead reckoning latitude 34° 20′ N. and longitude 4ʰ 58ᵐ W., the altitude of the sun being 17° 44′ 10″ at Greenwich mean time, 8ʰ 15ᵐ 1ˢ. Required the line of position D. The quantities are:

$$L = 34° \; 20' \; N.$$
$$D = 16° \; 56' \; S.$$
$$t = 3^h \; 33^m.$$

The operation of calculating altitude, H, is as follows:

1. The operator turns the disk 11 until its radial line 25 coincides on the scale 30 at 16° 56′ to the right of the starting line 27. The arm 12 is then turned until its radial line 26 coincides with 34° 20′ on the scale 30 to the left of the starting line 27. The arm 12 and the disk 11 are now fastened together, and then 2. Both the arm 12 and the disk 11 are moved together until the radial line 25 of the disk 11 coincides with 3ʰ 33ᵐ on the scale 35, and then the operator reads under the radial line 26 of the arm 12 on the scale 40 the number 159.2.

3. The disk 11 is turned until its radial line 25 coincides with the starting line 27 of the chart 10. The arm 12 is now set to L±D=51° 16′ on scale 50. The arm 12 is now clamped to the disk 11.

4. Both the arm 12 and the disk 11 are turned until the radial line 25 of the disk 11 is over 159.2 on the scale 41. The required altitude 17° 53′ is now found at the scale 50 under the radial line 26 of the arm 12.

To find the azimuth the operator proceeds as follows:

1. The disk 11 is turned until its radial line 25 indicates on $t$, scale 60, 3ʰ 33ᵐ. The arm 12 is now turned until its radial line 26 indicates on $h$, scale 60, 17° 53′. Both the arm 12 and the disk 11 are now clamped together.

2. The arm 12 and the disk 11 are now turned until the radial line 26 of the arm 12 indicates 16° 56′ on scale 30 to the right of the starting line 27. The azimuth 126¼° is now read at the radial line 25 of the disk 11 at the scale 60. As the latitude and the declination are of contrary names the azimuth is greater than 90° and hence as above it is N. 126¼° W. The logarithmic calculation gives the altitude as 17° 57′ and the azimuth as N. 126° 20′ W.

From the foregoing it will be seen that by the use of a chronometer, a sextant, and the navigation instrument, an aviator or a mariner can readily determine the position of the aeroplane or marine vessel without resorting to any calculations whatever. It will also be noticed that an aviator can readily manipulate the navigation instrument.

Although I have shown and described the chart 10 as stationary and the disk 11 and arm 12 as movable relative to the chart and relative to each other and movable together, it is evident that the disk 11 may be stationary and the chart 10 and the arm 12 movable relative to the disk, relative to each other and in unison, and hence I do not limit myself to the precise construction shown.

Having thus described my invention, I claim as new and desire to secure by Letters Patent:—

1. A navigation instrument comprising a chart having a series of concentric scales and a radial zero line intersecting the scales, one of the scales being for latitude starting from the said zero line in one direction and another of the scales being for declination and starting from the said zero line in the opposite direction, and indicating means movable relative to the chart and indicating on the said scales.

2. A navigation instrument for the mechanical solution of the mathematical work required in finding the position of a marine or air vessel by the St. Hilaire method of navigation, comprising scales representing the factors of the equation $$\text{hav. } Z = \cos. D \cos. L \text{ hav. } t + \text{hav. } (L \sim D),$$

in which Z represents zenith distance of the sun, star or other heavenly body, D represents declination of the sun, star or other heavenly body, L represents latitude by dead reckoning of the ship or air vessel, $t$ represents hour angle of the sun, star or other heavenly body as determined from the known position of the heavenly body and the longitude of the ship, and the abbreviations hav. and cos. having the usual trigonometric significance of haversines and cosines respectively, and indicating means adapted to coact with the said scales to permit of solving the said equation mechanically.

3. A navigation instrument for the mechanical solution of the mathematical work required in finding the azimuth of the sun, star or other heavenly body, comprising scales representing the factors of the equation $$\sin. A = \sin. t \cos. D \text{ and sec. } h,$$

in which A represents the required azimuth of the sun, star or other heavenly body, and $t$, D and $h$ represent respectively the hour angle, declination and altitude of the sun, star or other heavenly body, and the abbreviations have the usual trigonometrical significance, and indicating means adapted to coact with the said scales to permit of solving the said equation mechanically.

CHARLES LANE POOR.